United States Patent
Steidle et al.

(10) Patent No.: US 10,402,212 B2
(45) Date of Patent: Sep. 3, 2019

(54) METHOD AND SYSTEM FOR MAKING AVAILABLE AN ASSISTANCE SUGGESTION FOR A USER OF A MOTOR VEHICLE

(71) Applicant: Bayerische Motoren Werke Aktiengesellschaft, Munich (DE)

(72) Inventors: Markus Steidle, Augsburg (DE); Markus Strassberger, Wartenberg (DE); Christopher Roelle, Groebenzell (DE)

(73) Assignee: Bayerisch Motoren Werke Aktiengesellschaft, Munich (DE)

( * ) Notice: Subject to any disclaimer, the term of this patent is extended or adjusted under 35 U.S.C. 154(b) by 269 days.

(21) Appl. No.: 15/165,207

(22) Filed: May 26, 2016

(65) Prior Publication Data
US 2016/0274922 A1    Sep. 22, 2016

Related U.S. Application Data (63) Continuation-in-part of application No. PCT/EP2014/074982, filed on Nov. 19, 2014.

(30) Foreign Application Priority Data

Nov. 27, 2013 (DE) .................. 10 2013 224 279

(51) Int. Cl.
*G06F 3/048* (2013.01)
*G06F 9/451* (2018.01)
(Continued)

(52) U.S. Cl.
CPC .......... *G06F 9/453* (2018.02); *G06F 3/0482* (2013.01); *H04L 63/102* (2013.01); *H04W 4/02* (2013.01); *H04W 4/046* (2013.01); *H04W 4/90* (2018.02)

(58) Field of Classification Search
CPC ......... H04L 67/04; H04L 67/10; H04L 67/12; H04L 67/22; H04L 67/30; H04W 4/02; H04W 4/046; H04W 4/80; H04W 4/90
See application file for complete search history.

(56) References Cited

U.S. PATENT DOCUMENTS

| 6,064,730 A * | 5/2000 | Ginsberg ............ H04M 3/5191 379/265.09 |
| 9,384,491 B1 * | 7/2016 | Briggs .................... G08G 1/205 |

(Continued)

FOREIGN PATENT DOCUMENTS

| CN | 101466090 A | 6/2009 |
| CN | 101807337 A | 8/2010 |

(Continued)

OTHER PUBLICATIONS

International Search Report (PCT/ISA/210) issued in PCT Application No. PCT/EP2014/074982 dated Feb. 5, 2015, with English translation (six (6) pages).

(Continued)

*Primary Examiner* — Claudia Dragoescu
(74) *Attorney, Agent, or Firm* — Crowell & Moring LLP (57) ABSTRACT

A method is provided for making available an assistance suggestion for a user of a motor vehicle. The method determines information on the availability of helpers and displays the available helpers based on that information. After selecting a helper by the user, the method sets up a communication link between the user and the selected helper, makes available assistance information to the selected helper, and receives an assistance suggestion which is based on the assistance information made available.

11 Claims, 3 Drawing Sheets

(51) Int. Cl.
  *H04W 4/90* (2018.01)
  *H04W 4/04* (2009.01)
  *G06F 3/0482* (2013.01)
  *H04L 29/06* (2006.01)
  *H04W 4/02* (2018.01)

(56) References Cited

U.S. PATENT DOCUMENTS

| | | |
|---|---|---|
| 2002/0026370 A1 | 2/2002 | Tasler |
| 2009/0156160 A1 | 6/2009 | Evans et al. |
| 2009/0233572 A1 | 9/2009 | Basir |
| 2009/0284412 A1 | 11/2009 | Xiao et al. |
| 2011/0092227 A1 | 4/2011 | Phukan |
| 2011/0287733 A1 | 11/2011 | Cepuran et al. |

FOREIGN PATENT DOCUMENTS

| | | |
|---|---|---|
| CN | 102045535 A | 5/2011 |
| CN | 102546725 A | 7/2012 |
| DE | 100 41 336 A1 | 3/2002 |
| DE | 10 2006 042 474 A1 | 4/2008 |

OTHER PUBLICATIONS

German Search Report issued in counterpart German Application No. 10 2013 224 279.4 dated Feb. 26, 2014, with partial English translation (eleven (11) pages).

English Translation of Chinese-language Office Action issued in counterpart Chinese Application No. 201480064838.5 dated Dec. 26, 2018 (eight (8) pages).

English translation of Chinese-language Office Action issued in counterpart Chinese Application No. 201480064838.5 dated Jul. 19, 2018 (eight (8) pages).

\* cited by examiner

METHOD AND SYSTEM FOR MAKING AVAILABLE AN ASSISTANCE SUGGESTION FOR A USER OF A MOTOR VEHICLE

CROSS REFERENCE TO RELATED APPLICATIONS

This application is a continuation of PCT International Application No. PCT/EP2014/074982, filed Nov. 19, 2014, which claims priority under 35 U.S.C. § 119 from German Patent Application No. 10 2013 224 279.4, filed Nov. 27, 2013, the entire disclosures of which are herein expressly incorporated by reference.

BACKGROUND AND SUMMARY OF THE INVENTION

The present invention relates to a method and to a system for making available an assistance suggestion for a user of a motor vehicle.

At present, when a problematic situation or an emergency occurs the user of a motor vehicle can make contact with an emergency service by telephone in order to obtain help in solving the problematic situation. In order to make the corresponding service of these emergency services available, at present a multiplicity of call centers and hotlines which are operated independently of one another are set up which require a correspondingly large number of specially trained personnel.

As the technical devices in a motor vehicle continue to develop and there is also increasing integration of electronic communications technology in motor vehicles, the acceptance of the use of such emergency services is becoming more widespread and consequently the load on the call centers and hotlines is increasing. In view of the current economic developments in terms of personnel and increasing costs for the employed personnel, it is often not possible to extend call centers and/or hotlines given the available financial means. This means that a user of a motor vehicle who is in an urgent emergency situation finds in certain situations that he is placed in a queue when he calls a call center, as a result of which possibly important time is wasted for the user before he can get help.

Therefore it would be desirable to provide a method and a system for carrying out the method which contribute to relieving the load on the call centers and hotlines and therefore improve the quality of a call center.

The objective of the invention is to propose an improved emergency service for a user of a motor vehicle, which service avoids at least some of the disadvantages known from the prior art, or at least reduces them.

The object is achieved by means of a method and a system according to embodiments of the invention.

According to the invention, a method for making available an assistance suggestion for a user of a motor vehicle is provided, wherein the method comprises determining information on the availability of helpers and displaying available helpers on the basis of the information on the availability of helpers. In addition, the method comprises, after a selection of a helper by a user, setting up a communication link between the user and the selected helper, and making available assistance information to the selected helper, and receiving an assistance suggestion which is based on the assistance information which is made available.

A "motor vehicle" in the sense of the invention can preferably include here a vehicle, such as, for example, a motor-driven vehicle or turbine-driven vehicle. In particular, in this context a vehicle such as, for example, an automobile or a two-wheeled vehicle can be meant.

An "assistance suggestion" in the sense of the invention can preferably be here the provision of help in overcoming a problem, the solution to a question, an assistance during a procedure relating to the vehicle, or the like. This assistance suggestion is preferably made to the user of a vehicle by a helper. In particular, there may be provision here that the assistance suggestion provides, if appropriate, program-controlled status updating of a control software of the motor vehicle and/or of an apparatus which can be used in the motor vehicle.

A "helper" in the sense of the invention can preferably be here a source of help which is available to the user in overcoming a problem, solving a question, obtaining assistance during a process relating to the motor vehicle, or the like. The helper can be a human source of help as well as a non-human source of help. For example, computer-assisted and/or automated assistance programs can be used as a non-human source of help. Human sources of help can use, for example, a computer or the like for providing help. A human source of help may also be technical specialist personnel, for example, a motor vehicle workshop, an employee of an emergency call center or a call center or a support hotline or else also a person known to the user or an unknown third party, such as, for example, a driver traveling ahead, a driver who is known already to have experienced this problem, and the like.

"Availability information" in the sense of the invention can preferably be information indicating whether a helper can be reached at the respective moment and/or has access to a required means of assistance, in particular to corresponding appliances or information sources. In other words, it can be meant here that a helper could be capable of helping the user in the respective current situation.

A "communication link" in the sense of the invention can preferably mean in this context a text-based and/or speech-based link between two communication subscribers which permits them to exchange information. There can also be provision for information to be exchanged in the form of digitized data. For this purpose it is advantageous if both communication subscribers have at least one transmission possibility and one reception possibility.

"Assistance information" in the sense of the invention can preferably mean here information which is made available on the part of the user in order to communicate to the helper the required knowledge about a status and/or situation in which the user and/or the user's motor vehicle currently finds himself/itself and/or is expected to find himself/itself in the future.

The teaching according to the invention provides the advantage that owing to the possibility of a personal connection between the user and a helper, this helper is contacted with preference and it is possible to refrain from issuing a request to a call center or a technical assistance hotline. As a result, the load on a call center or the like can advantageously be reduced. As a result of this relieving of the load on the call center, corresponding operating costs can be saved and at the same time qualitatively better advice can be made available to the user without additional personnel. Furthermore, it is advantageous that the helper who may be known personally by the user can have recourse to his own experiences, for example, to the recommendation of a restaurant and/or to knowledge or information during the planning of the assistance suggestion which is possibly not available to an employee of a call center. A further advantage of the invention is that the period of time passing between the user's request and the provision of help by the helper can be reduced.

According to the invention, a system is provided for making available an assistance suggestion for a user of a motor vehicle. The system comprises a problematic situation-detector for detecting a problematic situation, an availability information unit for determining information on the availability of helpers, a display for displaying available helpers on the basis of the information on the availability of helpers, a communication linking unit for setting up a communication link between the user and a helper selected by the user, a making available unit for making available assistance information to the selected helper, and a reception unit for receiving an assistance suggestion which is based on the assistance information which is made available.

A "problematic situation-detector" in the sense of the invention can generally be in this context any device which is installed in a motor vehicle or can be carried along therein and which can detect information about a current status of the motor vehicle and/or of the user. In this context, in particular, the use of sensors and/or cameras arranged in the motor vehicle may be helpful.

A "problematic situation" in the sense of the invention can in this context mean a situation or a state during which the user and/or the user's motor vehicle finds himself/itself at the time of the assistance suggestion. The problematic situation can furthermore also be described and defined on the basis of properties which can be detected physically and also features which can be changed and influenced.

An "availability information unit" in the sense of the invention can mean generally means which can be used to determine availability of a potential helper. For this purpose, for example log-in information in an access-controlled network can be used to register whether a helper is currently active in the access-controlled network and, if appropriate, can be available to a user as a helper.

A "communication linking unit" in the sense of the invention can generally mean in this context a telecommunications transmission unit which has, in particular, a transmission device and a reception device. Such a telecommunications transmission unit can preferably be capable here of exchanging digitized information and data via a communication network with a corresponding opposite station, in particular of transmitting said information and data to said station and/or receiving it from said station. The respective opposite station within a communication network can also constitute an interface with a further communication network, as a result of which, for example, the transmitted data can be passed on to a cable-bound network via a radio communication network.

A "making available unit" in the sense of the invention can mean in this context a means for making available assistance information which can be detected on the part of the user by problematic situation-detecting means in order to describe a problematic situation and can be made available to a selected helper, with the result that on the basis of the item or items of assistance information the helper can formulate an assistance suggestion. There may, for example, also be provision that the making available unit converts the detected information relating to the problematic situation into a corresponding format which is conceived to be made available as assistance information, and can further modify the assistance information. Likewise, the making available unit can have an information memory, a data processing device and, in particular, a processor.

A "reception unit" in the sense of the invention can generally mean in this context a telecommunications reception unit which is configured, in particular, to receive an assistance suggestion of a helper and, if appropriate, at least partially process said suggestion and/or pass it on to a control unit which is, if appropriate, predetermined for this purpose or to a data processing device for further processing. The reception unit can also be configured, for example, as part of the communication linking unit.

The teaching according to the invention provides the advantage that the user can be enabled by use of the system preferably to make contact with a helper with a possible personal connection to the user and to refrain from calling a call center or a technical assistance hotline. As a result, the work load on a call center or the like can advantageously be reduced, as a result of which corresponding operating costs can be saved. In addition, the proposed system can also have all the advantages of the method proposed above.

Further exemplary refinements of the method are explained below.

Before refinements of the invention are described in more detail below, it is firstly to be noted that the invention is not restricted to the described components or the described method steps. Furthermore, the terminology which is used does not constitute a restriction either but instead is merely of an exemplary character. Insofar as the singular is used in the description and the claims, the plural is included in each case unless the context explicitly precludes it.

According to a first exemplary refinement, the method comprises the fact that the assistance information which is made available can be selected by the user.

This refinement has the advantage that the user always has control over the assistance information, and can therefore also prevent personal information, for example relating to the current location, being able to be passed on to unauthorized third parties.

According to a further exemplary refinement, the method comprises, after the assistance information has been made available, selection of further assistance information by the user, and making available the selected further assistance information to the helper.

This refinement has the advantage that the assistance information which is made available can be subsequently supplemented and/or adapted by the user. There is also the possibility of the helper being able to make enquires and/or request further additional assistance information which the user can subsequently select and consequently make available in a controlled fashion.

According to a further exemplary refinement, the method proposes that before the setting up of the communication link, authorization by the user has taken place.

"Authorization" in the sense of the invention can generally be understood to mean the consent of the authorizing party to a procedure or the granting of rights for third parties or with respect to third parties. In particular, it can be provided in this context that after the user has selected, if appropriate, a helper, the user must, if appropriate, make a further selection with respect to the assistance information and must give his consent to these procedures by means of the authorization. As a result, the user is preferably given sole control of the use of detected assistance information as well as of a selection of a helper. However, a possibility is also contemplated in which limited and also conditional transfer of this control, for example in an emergency situation, such as, for example, after an accident, can take place.

This refinement has the advantage that the user must authorize any assistance information before it is made available to a helper. As a result there is also the possibility of preventing assistance information which may contain, for example, personal data, from being made available to a helper or even to an unauthorized third party.

According to a further exemplary refinement, the method has the benefit of security hardware and/or security software of a connected, mobile communication device for authenticating the user.

A "mobile communication device" in the sense of the invention can also be considered, like the communication linking unit, to be a telecommunications transmission unit which has, in particular, a transmission device and a reception device. Such a telecommunications transmission unit may preferably be capable here of exchanging digitized information and data via a communication network to a corresponding opposite station, in particular of transmitting and/or receiving said information and data to and/or from said opposite station. In particular, the mobile communication device can be, for example, a cell phone, what is referred to as a Smartphone or a tablet computer.

"Authentication" in the sense of the invention can be a method for proving one's own identity. In this context, a user can prove his own identity in various ways. This may be done, for example, by proving knowledge of a password or by using a device, such as, for example, a key, in the user's possession. Immediate properties of the user himself, in particular biometric features, can also be used for authentication.

This refinement has the advantage that authorization of the user can be determined. It is therefore possible, for example, that a function, such as the remote-controlled opening of a central locking system of a motor vehicle, will be permitted only when authentication of the user and corresponding checking of the access authorization to the motor vehicle have been carried out.

According to a further exemplary refinement, the method comprises the fact that the communication link preferably has at least one voice link.

This refinement has, in particular in the case of a helper who is personally known to the user, the advantage that a voice which is known to the user can have a calming effect on the user in emergency situations, and in this reciprocal way the helper can more quickly recognize certain emotional changes from the user's voice. A further advantage is that as a result details can be discussed more quickly, permitting in general a faster solution of the problematic situation.

According to a further exemplary refinement, the method comprises, before the determination of the information on the availability of helpers describing a problematic situation by the user.

This refinement has the advantage that the user can at the beginning already evaluate information about the problematic situation, which can already be taken into account during the determination of the availability information. It may be advantageous, for example, if in time-critical emergencies, comprehensive determination of information on the availability of helpers can be prevented by limiting the determination merely to those helpers which have, for example, experience and/or particular training for the provision of medical and/or technical help. In other words, a helper directory which may, under certain circumstances, be present or a list of helpers can be limited by means of preliminary evaluation of the problematic situation, and, in addition, if appropriate helpers can be evaluated and can, for example, be given different properties in accordance with their respective capabilities.

According to a further exemplary refinement, the method comprises the fact that the assistance information which is made available is based on the problematic situation.

This refinement has the advantage that the helper can correspondingly detect and evaluate the assistance information which is made available to him, in order to obtain knowledge about the problematic situation which he is, if appropriate, to eliminate.

According to a further exemplary refinement, the method comprises the fact that a server is intermediately connected in the communication link between the user and the helper.

A "server" in the sense of the invention can be, for example, a computer which is, in hardware terms, a virtual or real computer, is networked to at least one terminal and can generally be configured to store data which is transmitted to it and to keep the data available for retrieval. In this context, the server can be implemented, for example, as a data server which can place the stored data in an ordered fashion in a structured database and store it. In addition, contact can preferably be established with a server by a multiplicity of end users or corresponding terminals via a corresponding logic interface, with the result that the data can be stored, retrieved and/or managed by the end users or the terminals.

This refinement has the advantage that by use of this server it is possible to carry out, in an automated fashion, a preliminary interpretation of the problematic situation and, if appropriate, to record communication between the user and helper in the event that a further helper is to be connected into the communication with the user at a later time.

According to a further exemplary refinement, the method comprises the fact that the determination of the information on the availability of helpers is carried out on the basis of a helper directory.

A "helper directory" in the sense of the invention can be a directory in the manner of a listing, a register or the like in which a multiplicity of items of information about a helper is compiled. This information about the helper can be made available, for example, by the helper himself or by the user. For particular emergencies, for example an automobile accident, emergency services such as police, fire service, technical assistance service or medical services may be compulsorily included in every helper directory.

This refinement comprises the advantage that a personal helper directory which is related to a respective user can be produced and managed, as a result of which advantages can be administered through a personal connection to the helper. Central storage of such a helper directory, for example on an Internet-enabled server, can be advantageous here.

According to a further exemplary embodiment, the method comprises the fact that the determination of information on the availability of helpers is carried out on the basis of information on the location of the user.

"Information on the location" in the sense of the invention can be understood as meaning information relating to or knowledge about a relative and/or absolute position of the user. This information relating to the current position of the user can be obtained, for example, by way of a connected terminal which has a global position-determining system. In this context, for example, known methods for determining positions by means of GPS, GLONASS, Galileo, WLAN stations, or else also triangulation of transmission signals of a positionally fixed transmission tower of a mobile radio network can be applied individually or in combination.

This refinement has the advantage that a helper who is in the immediate vicinity of the user and is able to provide assistance to the user in situ can be prioritized. This may be advantageous, for example, in the case of a flat tire or in order to supply a special tool which is not present in the motor vehicle.

According to a further exemplary refinement, the method comprises the fact that the displaying of available helpers is carried out on the basis of an evaluation of a respective helper.

An "evaluation" in the sense of the invention can generally be an evaluation of properties, capabilities and/or problematic situations already confronted via a helper. Therefore, it is possible, for example, that information, in particular about the technical knowledge and/or capabilities of a helper, can be evaluated automatically and under program control, and said helper can be evaluated once for the currently carried out displaying. Likewise, personal evaluation of the helper by persons can be provided in the manner of feedback from customers who this helper has helped in the past.

This refinement has the advantage that by use of such an evaluation criterion it is possible to provide a further feature according to which a helper can be prioritized and/or selected from a helper directory.

According to a further exemplary refinement, the method comprises the fact that a selection of resources is made available to the helper for the production of an assistance suggestion.

"Resources" in the sense of the invention can preferably be in this context a software computer program or a subroutine thereof which can use controlled access to a control unit of the motor vehicle. For example, in this context an engine control unit or a controller of a driver assistance system, in particular of a navigation device, can be read out and/or modified.

This refinement has the advantage that access to control programs and/or service programs of the motor vehicle electronics and/or data processing devices installed in the motor vehicle can be permitted to the helper.

According to a further exemplary refinement, the method comprises the fact that the resources made available are selected and/or limited as a function of the assistance information which is made available.

This refinement has the advantage that the access by the helper to control programs and/or service programs of the motor vehicle electronics and/or data processing devices installed in the motor vehicle can be easily limited and controlled in a situation-dependent fashion, in order to prevent the helper from inadvertently carrying out an incorrect function which can possibly even worsen the problematic situation.

According to a further exemplary refinement, the method also comprises automated execution of the assistance suggestion after corresponding authorization has been carried out by the user.

This refinement has the advantage that after explicit consent by the user to the assistance suggestion of the helper, the assistance suggestion can, if appropriate, be executed automatically, that is to say can be accepted and executed without further actions by the user. It is therefore possible, for example, for a helper who is a friend of the user to reprogram a navigation system of the motor vehicle while the user can continue to concentrate on the roadway.

According to a further exemplary refinement, the method comprises the fact that the corresponding authorization can be performed by the user by use of a mobile communication device.

This refinement has the advantage that as a result older motor vehicles may merely require minor retrofitting, during which the data-processing component of a mobile communication device of the latest generation can generally be made available. Through corresponding input possibilities of mobile communication devices, a device for inputting information can additionally be made available to the user. In addition, advantages arise with respect to a combination with a use of the mobile communication device for setting up a link to the helper and/or to a server or to a communication network.

According to a further exemplary refinement, the method provides that the assistance suggestion comprises at least one of the following events: a parameter or control instruction which is transmitted by the helper for an element of the motor vehicle electronics, an instruction relating to a manual procedure, a suggestion of an amended navigation route, recommendations of a location of interest.

A "parameter" in the sense of the invention can be any setting variable which can set a corresponding element of motor vehicle electronics.

This refinement has the advantage that, in particular, a multiplicity of possibilities with which the helper can make an assistance suggestion to the user may be used.

According to a further exemplary refinement, the method comprises the fact that the parameter is based on the motor vehicle and/or surroundings of the motor vehicle.

This refinement has the advantage that the parameter or parameters can be used for simple setting of the driving properties for possibly necessary adaptation of a driver assistance system or of a sub-component thereof.

Further exemplary refinements of the system are explained below.

According to a first exemplary refinement, the system has an execution unit for the automated execution of the assistance suggestion after corresponding authorization has been carried out by the user.

An "execution unit" in the sense of the invention can be any device which is installed in the motor vehicle and which is required to implement the assistance suggestion of the helper accordingly. For this purpose, it may be necessary, for example, for the helper to have to instruct first computer electronics, for example a driver assistance system, to modify a component of the engine controller, since, for example, the ultimate setting parameters cannot be known but have to be adjusted by means of corresponding sensors during the modification of the engine controller.

This refinement has the advantage that after explicit consent by the user to the assistance suggestion of the helper, the assistance suggestion can be automatically executed by the execution unit, that is to say can be executed without further action by the user. It is therefore possible, for example, for a helper who is a friend of the user to re-program a navigation system of the motor vehicle, while the user can at that time concentrate on the roadway, wherein the execution means can carry out re-programming of the navigation device in the motor vehicle in accordance with the assistance suggestion.

According to a further exemplary refinement, the system also has a server, wherein the server comprises a database with information at least relating to the availability of helpers, and the server is configured to establish a communication link between the user of the motor vehicle and an available helper.

This refinement has the advantage that the server which is connected via a data transmission network to a communication network which is being used can make available a database in a centralized fashion. Likewise, the server can advantageously manage, set up and monitor the communication link between the user and the helper. Likewise, the server can, as a result, be able to check the assistance information which is made available to the helper.

According to a further exemplary refinement, the system comprises the fact that the database of the server also comprises information relating to the contactability of the helpers.

It can therefore be determined whether a helper can currently be contacted via the selected or pre-set communication link. It is also possible to determine via which communication links a respective helper can be contacted, and whether said helper can currently be contacted via one of the communication links. The type of contactability, that is to say the type of communication link via which a respective helper can currently be contacted, can also be a criterion according to which helpers who are available for the specific problematic situation which has occurred can be made available for the user. If, for example, a potentially available helper can only be reached via a telephone link at the time of the occurrence of a problematic situation, said helper is a less suitable helper to receive the route information of the navigation system of the user and possibly to modify said information in accordance with the problematic situation, than another potential helper who can currently be reached by telephone and has just signed on to the server by means of an Internet-enabled computer.

This refinement has the advantage that as a result the server can always select the suitable and/or required communication link in its function of setting up and managing the communication link between the user and the helper, insofar as a helper can be contacted in various ways.

According to a further exemplary refinement, the system comprises the fact that the database of the server also comprises information relating to evaluation of the helper on the basis of a problematic situation.

This refinement has the advantage that as a result it is possible, for example, for information about, for example, technical knowledge and/or capabilities of a helper to be able to be collected, and for this information to be able to be taken into account by the server during, for example, the displaying of available helpers as a function of the problematic situation.

According to a further exemplary refinement, the system comprises the fact that the server also comprises a database with resources, which can be made available to the helper, relating to the problematic situation.

This refinement has the advantage that it is predetermined which access to which control program and/or service program of the motor vehicle electronics and/or data processing devices which are installed in the motor vehicle has to and/or can be made possible as a function of the problematic situation.

According to a further exemplary refinement, the system comprises the fact that the communication device exchanges data and/or information with a mobile communication device of the user.

In particular, there may be provision here that the communication device of the motor vehicle uses the mobile communication device of the user as an access point to a communication network which is connected to the mobile communication device. This refinement has the advantage that a helper directory which is related personally to the user can be stored, for example, on the mobile communication device of said user and can be read out by this mobile communication device in order to carry out the method.

According to a further exemplary refinement, the system comprises the fact that the communication device and/or the mobile communication device communicates using a wireless communication standard, selected, in particular, from the group comprising GSM, UMTS, LTE, CDMA2000, WLAN, NFC, Bluetooth.

This refinement has the advantage that in addition to transmitting a voice signal a transmission of digital data, which is also required under certain circumstances, can be made possible.

According to a further exemplary refinement, the system comprises the fact that the communication device can be connected in a wire-bound fashion to a mobile communication device.

This refinement has the advantage that as a result components of the mobile communication device which are possibly present can be activated and/or also used by the communication device which is installed on the vehicle side.

The invention therefore permits a method for making available an assistance suggestion for a user of a motor vehicle, and a system for carrying out the method, to be provided which can contribute to relieving the load on the call centers and hotlines and can therefore improve the quality of a call center. Furthermore, the invention can contribute to shortening the time period between the user looking for help and assistance being provided by the helper. This can have particularly advantageous effects for the users of motor vehicles which have found themselves in an emergency situation which is possibly life-threatening. In addition, the invention makes available a corresponding assistance system.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
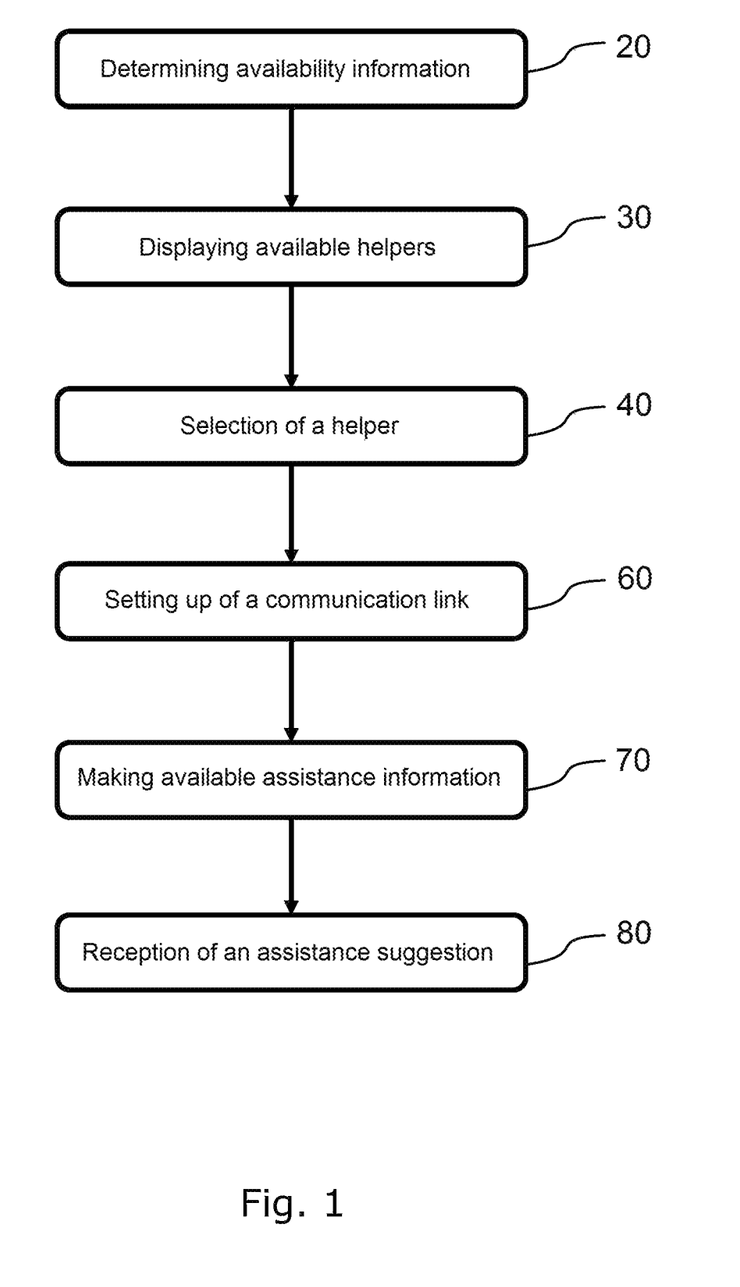
FIG. 1 is a schematic flowchart of a method according to an exemplary embodiment of the invention.

FIG. 1 shows a schematic flowchart of a method according to an exemplary embodiment of the invention.

In this context, FIG. 1 shows a flowchart of a method for making available an assistance suggestion for a user of a motor vehicle 100 (not shown in FIG. 1). The method comprises determining 20 information on the availability of helpers, and subsequent displaying 30 of the available helpers, on the basis of the information on the availability of the helpers. After a selection 40, carried out by the user, of a helper, preferably from the available helpers, setting up 60 a communication link between the user and the selected helper is provided. This is followed by making available 70 assistance information to the selected helper. After the helper has produced an assistance suggestion, receiving 80 an assistance suggestion which is based on the assistance information which is made available is also provided.

Figure 2:
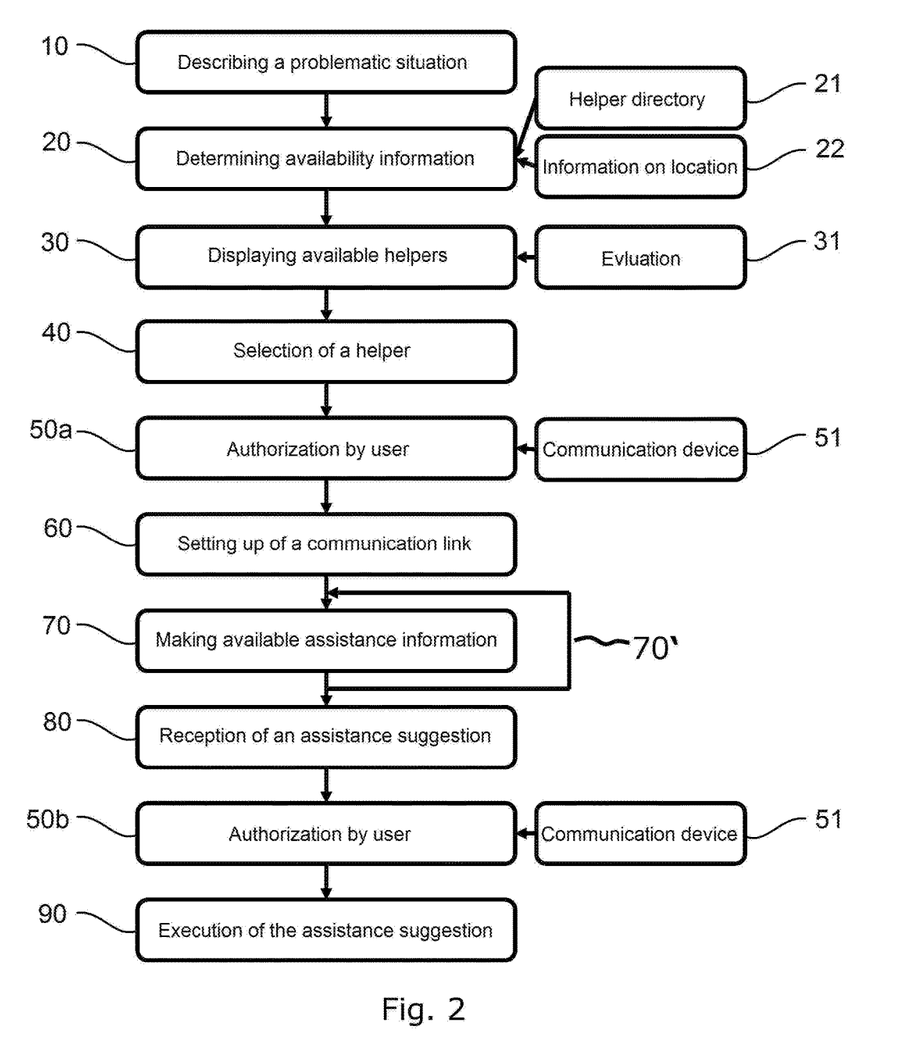
FIG. 2 is a schematic flowchart of a method according to a further exemplary embodiment of the invention.

FIG. 2 shows a schematic flowchart of a method according to a further exemplary embodiment of the invention.

In this context, FIG. 2 shows a flowchart of a method which is expanded compared to the method from FIG. 1. What has been stated above with respect to FIG. 1 continues to apply correspondingly to FIG. 2.

As can be inferred from FIG. 2, the method comprises, before the determination 20 of the information on the availability of helpers, describing 10 a problematic situation by the user. The determination 20 of the information on the availability of helpers can advantageously be carried out on the basis of a helper directory 21 and/or on the basis of information 22 on the location of the user. The displaying 30 of the helpers which have been determined as being available is carried out, if appropriate, on the basis of an evaluation 31 of the respective helper.

Before the setting up 60 of the communication link, according to the exemplary embodiment in FIG. 2 authorization 50a is carried out by the user. The corresponding authorization 50a can be performed by the user by means of a mobile communication device 51.

Furthermore it can be advantageously provided if, before the making available 70 of the assistance information to the helper, the assistance information which is to be made available is selected by the user, in particular since the assistance information which is made available should preferably be based exclusively on the problematic situation and personal and/or technical information which goes beyond this and is not required to make available an assistance suggestion is not to be unnecessarily passed on for reasons of data protection.

However, in the event of the initially selected assistance information being insufficient for the helper to produce an assistance suggestion, there is a possibility, in the event of enquiries by the helper, to carry out, after the making available 70 of the initially selected assistance information, for renewed selection of further assistance information to be carried out by the user, and for making available 70' of the selected further assistance information to the helper. This procedure can be repeated until the helper has received all the required assistance information and is able to make an assistance suggestion.

After the reception 80 of the assistance suggestion of the helper, corresponding authorization 50b of the received assistance suggestion by the user is also necessary before automated execution 90 of the assistance suggestion can be carried out. The corresponding authorization 50b by the user can also be performed by means of a mobile communication device 51.

Figure 3:
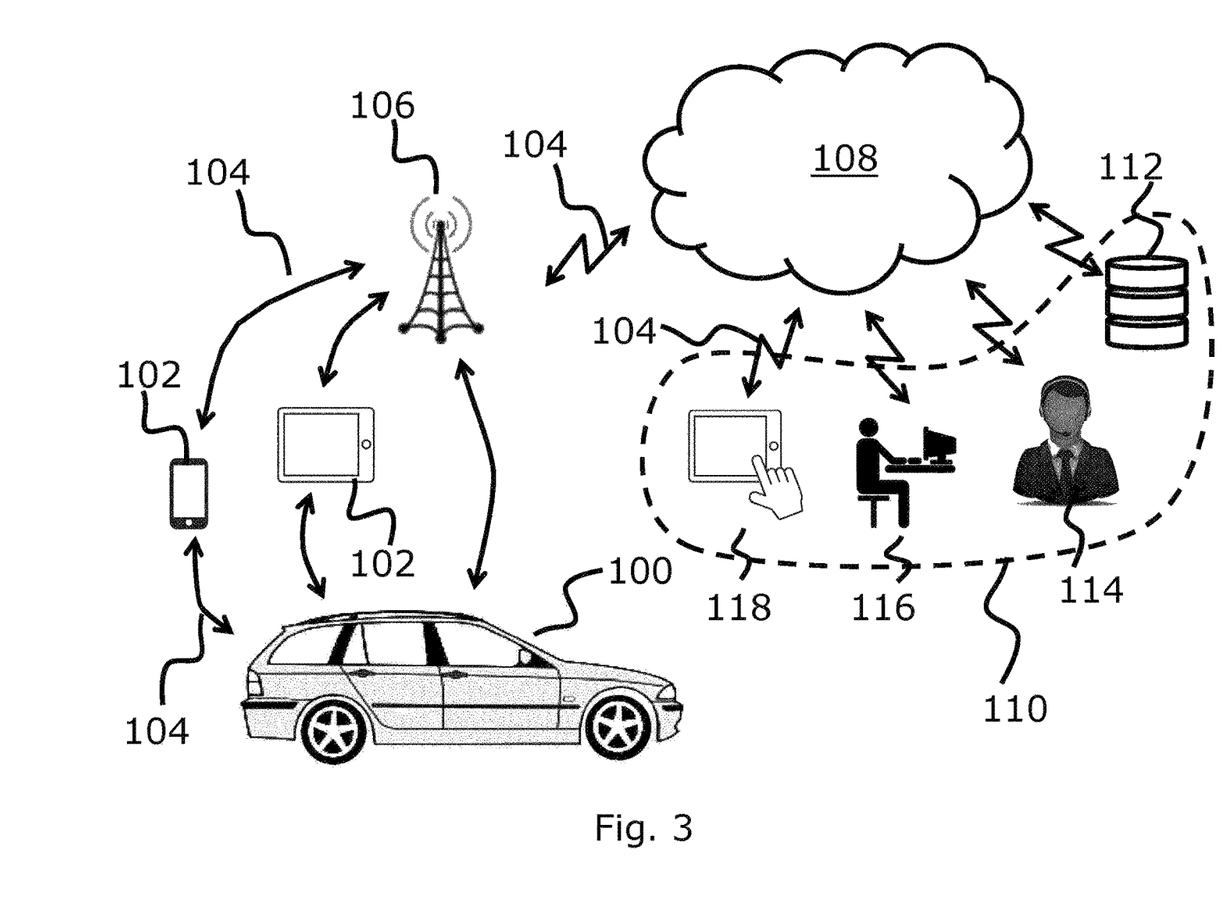
FIG. 3 is a schematic illustration of a system according to an exemplary embodiment of the invention.

FIG. 3 shows a schematic illustration of a suggested system for making available an assistance suggestion for a user of a motor vehicle according to an exemplary refinement of the invention.

In this context, FIG. 3 shows a system which can carry out a method according to the invention. The motor vehicle 100 has for this purpose at least one separately denoted problematic situation-detector for detecting a problematic situation. This can be, for example, one or more sensors, an engine control device and/or an on-board computer or, for example, also a driver assistance system of the motor vehicle 100.

In addition, an availability information unit for determining information on the availability of helpers 110 is provided, which availability information unit can be configured, for example, mainly in the form of a data network and/or an information network between the helper 110 and a server (not illustrated) which is, if appropriate, arranged centrally and/or the motor vehicle 100 itself. The determination of availability information is preferably to be understood as meaning that it is checked whether a helper 110 can be connected to the motor vehicle 100 via a communication network 108, which is implemented as a cloud in FIG. 3, by means of a voice link and/or a data link. This can also include determining whether a helper 110 is capable of doing this both technically and also in terms of time. The helper 110 can in this context be, for example, a database 112, an employee in a call center 114 or else a person who is known to the user, at a computer 116, or a person who is equipped with a mobile data processing device 118.

In addition it is provided that the user of the motor vehicle 100 is provided with a visual display of the available helpers 110 via a display, on the basis of the information on the availability of helpers 110. For this purpose, for example a display in the dashboard of the motor vehicle 100, in particular a display of a navigation device, of a head up display in a vehicle window or else also a display of a mobile communication device 102, which display is connected to the motor vehicle 100 by communication technology, can serve as the display. In addition, the motor vehicle 100 has a communication linking unit for setting up a communication link 104 between the user and a helper 110 selected by the user. The communication link can for this purpose be set up, in particular, via a transmission device and reception device 106 of a communication network 108.

On the user side, the system also has a making available unit for making available assistance information to the selected helper 110, which transmits the assistance information in a suitable format to the helper 110 by means of the communication link 104. In order to receive an assistance suggestion, based on the assistance information which is made available, of the helper 110, the user of the motor vehicle has a reception unit, for example in the form of a separate reception device or else a reception apparatus in a connected mobile communication device 102.

In addition, it can also advantageously be provided that the system has an execution unit for the automated execution of the assistance suggestion after corresponding authorization has been carried out by the user.

The server (not illustrated in FIG. 3) is preferably configured to establish a communication link 104 between the user of the motor vehicle 100 and an available helper 110, wherein the server is intermediately connected in the communication link 104 between the user and the helper 110. In addition it is possible for the communication link 104 to preferably have at least one voice link.

According to the system, the server can also include a database 112 with information at least relating to the availability of helpers 110, information relating to the contactability of the helpers 110, information relating to an evaluation of the helpers 110 which is based on the assistance situation, or information relating to resources which can be made available to the helper, with respect to a problematic situation.

In addition FIG. 3 shows that the communication device of the motor vehicle 100 can exchange data and/or information with a mobile communication device 102 of the user. This is also advantageous, in particular, if security hardware and/or security software of the connected mobile communication device 102 can be used for authenticating the user.

LIST OF REFERENCE NUMBERS

10 Describing a problematic situation
20 Determining availability information
21 Helper directory
22 Information on location 30 Displaying available helpers
31 Evaluation
40 Selection of a helper
50a, 50b Authorization by user
51 Communication device
60 Setting up of a communication link
70, 70' Making available assistance information
80 Reception of an assistance suggestion
90 Execution of the assistance suggestion
100 Motor vehicle
102 Mobile communication device
104 Communication link
106 Transmission/reception device
108 Communication network
110 Helper
112 Database
114 Call center
116 Computer
118 Mobile data processing device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for making available an assistance suggestion for a user of a motor vehicle, the method comprising the acts of:
    determining, by a processor, information on availability of helpers and information on contactability, which indicates a type of communication link via which the helpers are contactable, of the helpers,
    displaying, on a display, available helpers based on the information on the availability of the helpers and the information on the contactability of the helpers;
    receiving, from an input device, a selection by the user of a helper from the available helpers; and
    after receiving the selection by the user,
    (i) setting up, by a transceiver, a communication link between the user and the selected helper,
    (ii) making available, by the processor, assistance information to the selected helper, and
    (iii) receiving, on the display, an assistance suggestion which is based on the assistance information which is made available,
    wherein the selected helper is already personally known to the user.

2. The method according to claim 1, wherein, before the setting up of the communication link, authorization by the user has taken place.

3. The method according to claim 1, wherein the method comprises, before the determining of the information on the availability of helpers:
    describing a problematic situation by the user.

4. The method according to claim 1, wherein the determining of the information on the availability of helpers is carried out on the basis of a helper directory.

5. The method according to claim 4, wherein the determining of the information on the availability of helpers is carried out on the basis of information on the location of the user.

6. The method according to claim 1, wherein the determining of the information on the availability of helpers is carried out on the basis of information on the location of the user.

7. The method according to claim 1, wherein the displaying of available helpers is carried out on the basis of an evaluation of the respective helper.

8. The method according to claim 1, further comprising the act of:
    automatically executing the assistance suggestion after corresponding authorization has been provided by the user.

9. The method according to claim 2, wherein the authorization by the user is performed by the user via a mobile communication device.

10. A system for making available an assistance suggestion for a user of a motor vehicle, comprising:
    a controller that receives inputs from sensors, determines whether a problematic situation exists in the motor vehicle based on the inputs from the sensors, and determines information on availability of helpers and information on contactability, which indicates a type of communication link via which the helpers are contactable, of the helpers;
    a display that displays available helpers based on the information on the availability of the helpers and the information on the contactability of the helpers;
    a transceiver that sets up a communication link between the user and a helper selected by the user;
    a processor that provides assistance information to the selected helper, and a receiver that receives an assistance suggestion which is based on the assistance information which is provided,
    wherein the selected helper is already personally known to the user.

11. The system according to claim 10, further comprising:
    an execution unit that automatically executes the assistance suggestion after corresponding authorization has been provided by the user.

* * * * *